United States Patent
Ferguson et al.

(10) Patent No.: US 8,588,733 B2
(45) Date of Patent: Nov. 19, 2013

(54) WIRELESS DEVICE EMERGENCY SERVICES CONNECTION AND PANIC BUTTON, WITH CRIME AND SAFETY INFORMATION SYSTEM

(75) Inventors: Daniel Lee Ferguson, Van Nuys, CA (US); Tony Charles Lonstein, Encino, CA (US)

(73) Assignee: LifeStream Corporation, Van Nuys, CA (US)

(*) Notice: Subject to any disclaimer, the term of this patent is extended or adjusted under 35 U.S.C. 154(b) by 218 days.

(21) Appl. No.: 12/945,827

(22) Filed: Nov. 12, 2010

(65) Prior Publication Data

US 2011/0111728 A1 May 12, 2011

Related U.S. Application Data

(60) Provisional application No. 61/260,305, filed on Nov. 11, 2009, provisional application No. 61/349,581, filed on May 28, 2010.

(51) Int. Cl.
*H04M 11/04* (2006.01)
*H04B 7/00* (2006.01)
*H04B 17/00* (2006.01)

(52) U.S. Cl.
USPC ............ 455/404.2; 455/521; 455/67.11; 379/45

(58) Field of Classification Search
USPC ............ 455/404.2, 404.1, 521, 412.1, 575.1; 379/37, 45; 340/574, 379, 45, 37; 370/355.01–355.1
See application file for complete search history.

(56) References Cited

U.S. PATENT DOCUMENTS

| | | | |
|---|---|---|---|
| 5,223,844 A * | 6/1993 | Mansell et al. | 342/357.31 |
| 5,555,286 A | 9/1996 | Tendler | |
| 6,044,257 A | 3/2000 | Boling et al. | |
| 6,243,039 B1 | 6/2001 | Elliot | |
| 6,362,778 B2 | 3/2002 | Neher | |
| 6,807,564 B1 | 10/2004 | Zellner et al. | |
| 6,847,892 B2 * | 1/2005 | Zhou et al. | 701/408 |
| 7,020,440 B2 * | 3/2006 | Watanabe et al. | 455/67.11 |
| 7,113,090 B1 | 9/2006 | Saylor et al. | |

(Continued)

FOREIGN PATENT DOCUMENTS

| | | |
|---|---|---|
| EP | 1 072 160 B1 | 8/2003 |
| EP | 1 513 124 | 3/2005 |
| GB | 23 933 06 | 3/2004 |

OTHER PUBLICATIONS

PhantomEye launches MySpot "Panic Button" for GPS smartphones, http://idg.com.au/mediareleases/749/phantomeye-launchesmyspot-panic-button-for-gps-sm/, Nov. 24, 2007.

(Continued)

*Primary Examiner* — Dwayne Bost
*Assistant Examiner* — Scott Trandai
(74) *Attorney, Agent, or Firm* — Bingham McCutchen LLP

(57) ABSTRACT

A system and method for providing a conduit to send information to emergency services from a wireless device. Systems and methods for registering an alarm button on a wireless device and sending to public and/or private emergency services providers information related to the wireless device including its location, information about a wireless device end user and/or subscriber associated with the wireless device, and information recorded by one or more wireless devices during and subsequent to the time the alarm button is activated.

17 Claims, 5 Drawing Sheets

(56) References Cited

U.S. PATENT DOCUMENTS

| | | | |
|---|---|---|---|
| 7,136,747 B2* | 11/2006 | Raney | 701/465 |
| 7,469,138 B2 | 12/2008 | Dayar et al. | |
| 7,580,405 B2 | 8/2009 | Laliberte | |
| 7,873,345 B1* | 1/2011 | Dunne et al. | 455/404.1 |
| 2002/0072348 A1* | 6/2002 | Wheeler et al. | 455/404 |
| 2002/0080025 A1* | 6/2002 | Beattie | 340/506 |
| 2003/0013467 A1* | 1/2003 | Caloud | 455/466 |
| 2003/0048184 A1* | 3/2003 | de Bonnenfant | 340/531 |
| 2003/0112141 A1* | 6/2003 | Arunkumar | 340/539.18 |
| 2004/0103157 A1* | 5/2004 | Requena et al. | 709/206 |
| 2004/0133646 A1 | 7/2004 | Leukert-Knapp et al. | |
| 2004/0184584 A1* | 9/2004 | McCalmont et al. | 379/45 |
| 2004/0196821 A1* | 10/2004 | Haddad et al. | 370/349 |
| 2004/0247161 A1* | 12/2004 | Storm | 382/117 |
| 2005/0130670 A1* | 6/2005 | Gould et al. | 455/456.1 |
| 2006/0001539 A1 | 1/2006 | Adamczyk et al. | |
| 2006/0201964 A1* | 9/2006 | DiPerna et al. | 222/78 |
| 2007/0082652 A1 | 4/2007 | Hartigan et al. | |
| 2007/0086578 A1* | 4/2007 | Hansen et al. | 379/45 |
| 2007/0283005 A1* | 12/2007 | Beliles et al. | 709/224 |
| 2008/0000530 A1 | 1/2008 | Sun et al. | |
| 2008/0030350 A1 | 2/2008 | Brenner | |
| 2008/0214142 A1* | 9/2008 | Morin et al. | 455/404.2 |
| 2008/0268870 A1 | 10/2008 | Houri | |
| 2008/0274752 A1 | 11/2008 | Houri | |
| 2009/0093229 A1 | 4/2009 | Grunow et al. | |
| 2009/0098898 A1* | 4/2009 | Patterson | 455/521 |
| 2009/0186596 A1* | 7/2009 | Kaltsukis | 455/404.2 |
| 2009/0279674 A1 | 11/2009 | Roberts | |
| 2010/0040029 A1* | 2/2010 | Doppler et al. | 370/338 |
| 2010/0134277 A1* | 6/2010 | Jang | 340/539.13 |
| 2010/0311387 A1* | 12/2010 | Cameron et al. | 455/404.2 |
| 2011/0059734 A1* | 3/2011 | Dunne et al. | 455/420 |
| 2011/0111728 A1* | 5/2011 | Ferguson et al. | 455/404.2 |

OTHER PUBLICATIONS

Mobile phone emergency call button, http://www.e-bility.com/disability-news/sos-mobile-phones.php, Jan. 13, 2010.
GPS Phone, http://www.gpsonroad.net/gpsphone.htm, accessed Mar. 18, 2010.
Gps tracker, http://www.navigadget.com/index.php/2008/02/26/gps-tracker, Feb. 26, 2008.
International Search Report dated Jan. 18, 2011.

* cited by examiner

WIRELESS DEVICE EMERGENCY SERVICES CONNECTION AND PANIC BUTTON, WITH CRIME AND SAFETY INFORMATION SYSTEM

CROSS-REFERENCE TO PRIOR APPLICATIONS

This application claims the benefit of provisional application 61/260,305, filed Nov. 11, 2009, the entirety of which is incorporated by reference, and provisional application 61/349,581, filed May 28, 2010, the entirety of which is incorporated by reference.

FIELD OF THE INVENTION

The present invention relates to systems and methods for providing a conduit to send information to emergency services from a wireless device, and, more particularly, to systems and methods for registering an alarm button on a wireless device and sending to public and/or private emergency services providers information related to the wireless device including its location, information about a wireless device end user and/or subscriber associated with the wireless device, and information recorded by one or more wireless devices during and subsequent to the time the alarm button is activated.

BACKGROUND OF THE INVENTION

For decades, many countries around the world have provided telephone users and subscribers direct telephone access to local emergency service providers or dispatchers through a dedicated telephone number. Emergency telephone numbers are meant to be used by a caller in need of urgent assistance and differ from region to region, but are often one or more short number sequences, such as 911 and 999, that can be easily recalled and dialed quickly.

In many localities, calls to an emergency telephone number are not routed directly to service providers such as police, firefighting, medical or ambulance services, or other public safety personnel, but are instead directed to a call center called a Public Safety Answering Point or Public Safety Access Point (PSAP), staffed by operators trained to obtain relevant information from callers necessary to dispatch the appropriate emergency services to the correct location. In some areas, when the emergency telephone number is dialed, routing infrastructure in the telecommunications system automatically associates a physical address with the calling party's telephone number, known as Caller Location Information (CLI), and routes the call to the most appropriate PSAP for that address. Commonly when this infrastructure is available CLI is integrated into a computer-assisted dispatch (CAD) system at the PSAP, and is displayed with other information to a PSAP operator when they receive the call, which is meant to provides emergency responders with the location of the emergency without the person calling for help having to provide it. Regulations governing telecommunications providers in the United States require the provision of caller location infrastructure, but there is no requirement that PSAPs be able to receive such information.

Despite these regulations, deficiencies in the existing telecommunications infrastructure have challenged callers, dispatch operators, and first responders. For example, the PSAP to which a particular call is routed may not, under certain circumstances, be the appropriate or nearest service provider, in some cases because the emergency telephone system was based on the wire-line system where a number was assigned to a specific address rather than modern digital and/or wireless systems where the number and location of the calling party may or may not be related to a billing or other physical address. In addition, digital phone systems are capable of configuration by an administrator or end user to store, among other things, additional information about the device and users, with the assistance of or independently of the telecommunications provider, but the telecommunications infrastructure is not presently configured to transmit the information in a format that CADs or other PSAP systems can use.

As a result, dialing an emergency telephone number from a mobile device or digital telephone may connect the call to an incorrect or inconvenient PSAP and/or a default PSAP such as the state police or highway patrol of the locality or other jurisdiction for example where a calling number is provisioned or a cell tower is located, instead of the appropriate PSAP. Initiating a call to the incorrect PSAP in an emergent situation can result in failure to connect a caller to the appropriate emergency responders, or at minimum delay an emergency response and require a caller to describe the location of an emergency so a dispatcher may transfer or relay the call to the correct emergency service provider or dispatcher. Furthermore, modern CADs and other telecommunications and emergency infrastructure are incapable of receiving information about the device and users in addition to location and subscriber name that can now be programmed into wireless devices and other digital communications equipment connected to specific end-users.

There are standards for systems designed to integrate telephone and emergency systems. CADs and other systems that enhance the ability of dispatchers and call-center employees to integrate telecommunications and data systems such as informatics are generally referred to as telematics. In the United States, the National Emergency Number Association (NENA) sets the standard formats and protocols for Automatic Location Identification (ALI) data exchange between Service Providers and Data Base Management System Providers, a GIS data model, a Data Dictionary, and formats for data exchange between the ALI Database and PSAP Controller equipment. The existing ALI standard for Telematics is flexible but there are preferred formats, and there are requirements and conventions that are specific to certain jurisdictions.

The gap in capability between end-user equipment and emergency service providers is due partly to legacy configurations of existing equipment that must meet ALI and other CAD/Telematics standards in order to be backwards-compatible, and the inability of service providers to predict emerging development in end-user equipment capability quickly enough to implement new systems or update existing ones before they are overcome by the need for further enhancements.

Although national and international regulatory agencies such as the United States Federal Communications Commission (FCC) have issued regulations requiring licensed telecommunications providers of digital services such as wireless carriers and Voice-Over-IP (VOIP) providers to determine and transmit the location of emergency telephone number callers, limited funding, the complexity of the coordination required from wireless carriers, PSAPs, local telephone companies and other affected organizations, and other factors have hampered the standardization and conversion of handsets, other mobile devices, telecommunications infrastructure, CADs, and other PSAP and telecommunications equipment to implement the required changes. Nevertheless, some enhanced technology has been implemented that is useful for the provisioning of emergency services, for instance, newer wireless handsets are equipped to determine their location using that one or more of, for example, Global Positioning System (GPS), wireless networks, cell towers, and other navigation and positioning technologies.

What is needed, then, is a method and system capable of providing enhanced location and other information available from programmable digital end-user communications devices to PSAPs and other emergency responders using existing CADs and other telecommunications infrastructure and technology which is compatible with existing regulations and telematics standards, and which has the ability to enhance these existing systems without major re-fitting as technology develops and standards change.

SUMMARY OF THE INVENTION

The present invention relates to a system and method for providing enhanced location and other information to PSAPs and other emergency responders. According to one embodiment of the present invention, a method of registering and distributing an alarm includes registering that an alarm button has been pressed from a mobile device, accessing a database to read address information for parties to contact, sending at least one message to at least one address, determining elapsed time and at a predetermined interval, sending at least one additional message to an emergency services center. In another embodiment of the invention, the method includes determining the location of the mobile device and transmitting the location as part of at least one of the messages. In an additional embodiment, the emergency services center is chosen based on the location. In one embodiment of the present invention at least one message comprises a SIP message.

According to one embodiment of the present invention, a system for registering and distributing an alarm comprises a processor operable to execute computer program instructions and a memory operable to store computer program instructions executable by the processor, for performing the steps of registering that an alarm button has been pressed from a mobile device, accessing a database to read address information for parties to contact, sending at least one message to at least one address, determining elapsed time and, at a predetermined interval, sending at least one additional message to an emergency services center.

According to one embodiment of the present invention, a computer program product for registering and distributing an alarm the computer program product comprises a computer readable medium, computer program instructions recorded on the computer readable medium, executable by a processor, for performing the steps of registering that an alarm button has been pressed from a mobile device, accessing a database to read address information for parties to contact, sending at least one message to at least one address, determining elapsed time and at a predetermined interval, sending at least one additional message to an emergency services center.

In an additional embodiment of the present invention, a method for registering an alarm on a wireless device, comprises providing software on the wireless device, registering a key on the wireless device as a Panic Button, determining that the key is pushed, sending a request from the wireless device to a server, receiving from the server information including an address, and sending a text message from the wireless device to the address. In another embodiment of the present invention the method includes determining the location on the wireless device and sending the location and an identifier as part of the text message. In an additional embodiment, the method includes sending a message from the server to a police station nearest to the location if an escalation code and the identifier is sent to the server. In another embodiment of the present invention the method includes determining elapsed time and at a predetermined interval, sending a message from the wireless device to a call center, sending a message from the call center to the wireless device, determining additional elapsed time and at an additional predetermined interval, sending at least one message from the call center to a police station nearest to the location. In another embodiment of the invention, the method includes sending information stored on the server to the police station.

DETAILED DESCRIPTION OF THE INVENTION

Figure 1:
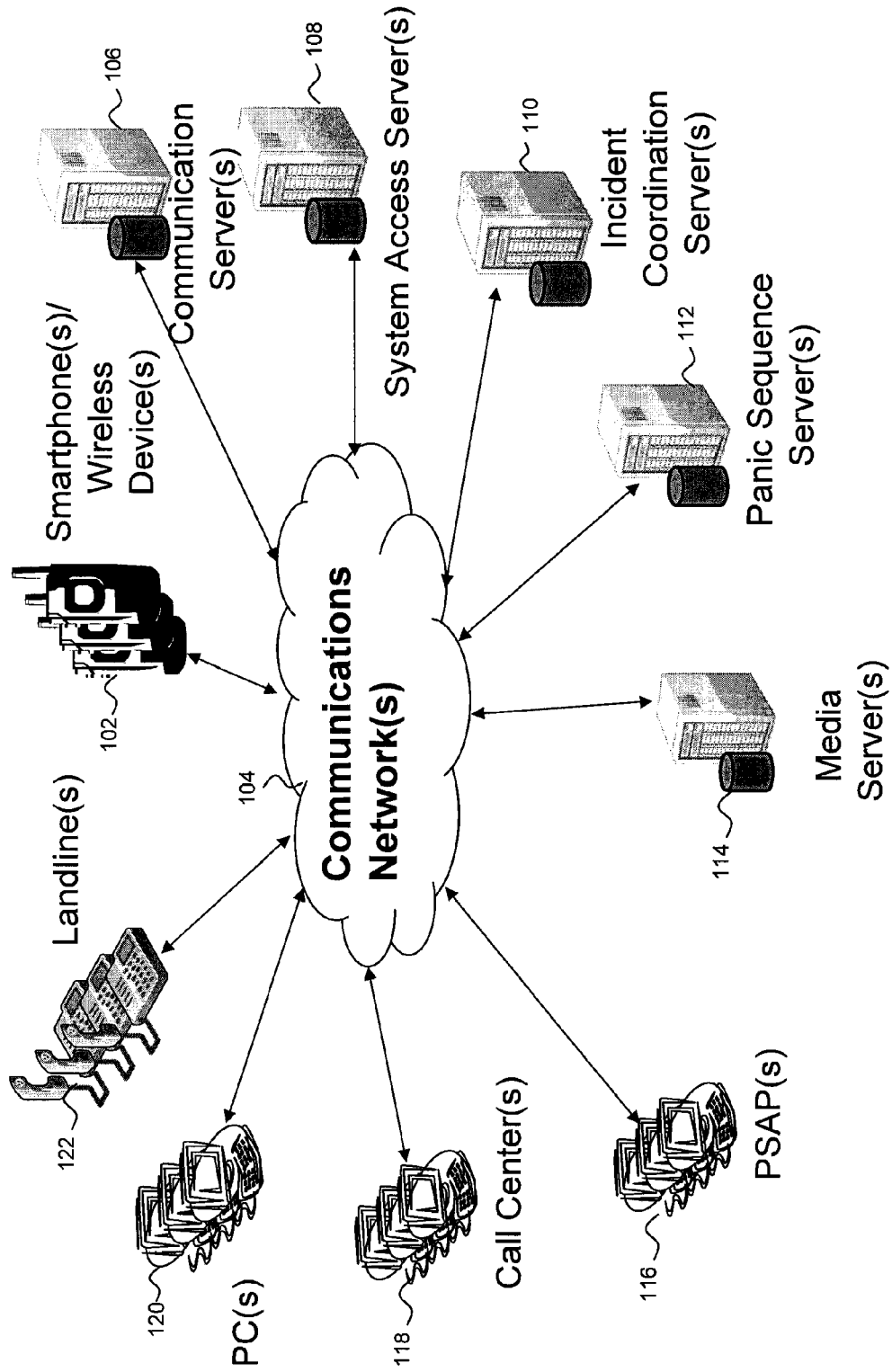
FIG. 1 depicts an exemplary system according to an embodiment of the present invention.

In a preferred embodiment of the invention, one or more web sites and related services provide advanced safety tools that enable wireless or other telecommunications device subscribers to protect themselves and/or other users from harm; for example, parents may use such tools for the benefit of themselves and their children. A subscriber may be an end-user, parent, family unit, or organization, for example a school, a municipality or other government organization, a service provider, or a business. For example in a preferred embodiment a school system that is a subscriber may distribute one wireless handset to each of its students, the end-users. In another preferred embodiment a parent or guardian may subscribe to and pay for a software-based service installed on their child's wireless device.

Initial setup of the software may be done by one or more of a device manufacturer, distributor, retailer, subscriber, authorized stakeholder (for example, a parent, guardian, or school safety official), or end-user. Options relating to features described below such as safety networks or guardians, vital information, designating inputs as a panic button, periodic update preferences and frequency, and other options configurable in the software may be either required or optional for successful operation of the system through the wireless device. These options may have defaults included in all installed software or may be set as a requisite to activation of the software. For example, individuals included in a safety network and/or designated as friends, family, and neighbors may be set as a default to the person originally subscribing to the service, or may be blank initially.

Options and other inputs may be entered on the wireless device through inputs such as through numeric keys corresponding to a traditional touch-tone keypad, alpha numeric keys, or touch screen, via a wired or wireless connection from the wireless device to another device such as a computer, or via a website which connects through a cellular or other wireless network to update the wireless device. Permission to change options may be restricted through password protection or other means such as RSA key or a requirement that a direct connection be made between a wireless device and a security measure, for example a hardware token or USB or other format security key.

Installation and configuration of safety system software may be accomplished in a variety of ways. Software that is a component of a safety system may be installed on a wireless device by the manufacturer, distributor, or after it is sold. The software may be pre-compiled or compiled with the wireless device's operating system.

In one embodiment an existing key on the wireless device is configured to be the Panic Button. In another embodiment, for example in the case of a device equipped with a touch screen interface, the button may be replaced by an icon. The icon or button may have default appearance and/or position, and in addition may be configured by a service provider, subscriber, or end-user using the panic button software.

In one embodiment a panic button may be a single button or combinations of buttons or other inputs, for example, a pattern drawn on the touch screen of a wireless device, or emergency services telephone number such as 911 may be treated as a panic button actuation. In addition, rather than actuating the panic button, another event such as location, system alert, or other trigger may occur which instigates a panic alert or escalation sequence on one or more subscriber's wireless devices.

A default key or input, combination of keys or inputs, or drawn symbol (in the case of a touchscreen) may be set as the panic button, and/or a distributor, subscriber, end-user, or other user may choose an existing key, input, combination of keys or inputs, or drawn symbol on the wireless device that they will designate as the panic button. If multiple keys are designated as the panic button, they may be configured to be pressed at the same time or in sequence, or a combination thereof. The configuration may occur on the wireless device or using another device or a website or other network-accessible resource connected to the wireless device through a wired or wireless connection or through the telecommunications network. Additional keys, inputs, combinations of keys or inputs, or drawn symbols may also be set or default to other features such as downloading of crime alerts or information. The selected inputs are registered on the wireless device with the proprietary software or software provided on the wireless device's operating system or other complimentary configuration software.

In one embodiment a panic button is implemented on a wireless or other telecommunications device through software installed and configured by one or more of the device manufacturer, a wireless service provider, a device retailer, a subscriber, or an end user. The wireless device is preferably a smart phone running an operating system for example Java, Android, Windows Mobile, Java ME, iPhone, or Symbian. Examples of wireless devices include a traditional cell phone or other wireless communications device with computing capability such as a smart phone, tablet, PDA, iPhone, etc. In one embodiment the wireless device may be a tablet such as an iPad, a car-mounted system such as an in-dash navigation system, a laptop, or a device designed primarily to provide emergency safety notification.

The panic button software, including configuration options such as the location or appearance of the panic button, may be updated remotely using over the air (OTA) update technology. Updates may be generated by the service provider, or be prompted by configuration updates made to a password-protected webpage associated with the subscriber's account. In addition, a wireless device may be connected via cable, Bluetooth or other wireless connection to a computer or other electronic device in proximity to the wireless device and configured to update or manipulate the options of the panic button software.

In one embodiment user actuation of the panic button alerts one or more of friends, families, other designated individuals, a call center, a PSAP, or emergency first responders such as police, firefighters, or emergency medical personnel. One or more of these individuals or organizations may be termed "safety network members" or a "safety network" and may be configured on the telecommunications device by one or more of the device manufacturer, wireless service provider, subscriber, or end-user. In one embodiment, if the subscriber wants a contact such as an individual or organization to be a member of their safety network a text message or other electronic invitation such as an e-mail or telephone call may be sent inviting the contacts to join the user safety network. An invitation may be kept open for a limited period of time or may expire after a duration. In a preferred embodiment, unless they accept an invitation an invited contact will not be included in a safety network they had not previously been members of however, other individuals may be added to a safety network, for example they are set as a default (for example a call center, PSAP, or school system subscriber), they request inclusion and the request is accepted, are subscribers affiliated with end-users account, or other methods.

In the case of a text message invitation, and invited contact may accept the invitation by sending a text message with a code word, or by accepting the invitation through a website or other network accessible resource. An e-mail invitation may include a link or URL to a website or other network accessible resource to accept the invitation. An invitation by telephone may be completed using an IVR system or other automated phone system, or be carried out by call center personnel/The invited contact may accept or reject the invitation and may also be offered additional configuration options such as whether they are willing to share their location using wireless device location-based services whether they are willing to accept panic button requests or whether they are willing to share other types of information or receive other types of alerts. In addition, when an end user or subscriber chooses to invite a contact to be a member of their safety network they may opt for the contact to have some but not all the privileges of being a member for example, to receive panic button alerts, have access to the user's location, to receive informational or it's, or to receive other types of information or have access to one or more password-protected websites or other network accessible resources. An end-user or subscriber may manage the contacts in their safety network and safety network members may opt in or opt out a safety networks on an as-needed basis.

In one embodiment when a panic button is pushed on a wireless device a pre-designated individual or individuals such as friends, family, and neighbors will be notified within a default or configurable interval. These designated individuals may be a safety network or other selected individuals. For example, actuating a panic button on the wireless device may generate an alert to a configurable group of individuals (who may be called "Guardians") that may vary depending on factors such as time of day, location, level of threat at location, or level of threat system-wide, and the group may include friends, families, school officials such as teachers and administrators, emergency safety system provider's call center, and police.

In a preferred embodiment of the present invention, a call center affiliated with one or more of a handset manufacturer, wireless service provider or other telecommunications service provider, or panic button or other emergency service software provider such as an emergency safety system service provider may be a default or required member of the safety network associated with the device. For example, the call center may be staffed with trained personnel who are accessible from wireless devices that have software or hardware that implements panic button or emergency telephone number call communications routing, and to have access to location and other information stored or generated on the wireless device and/or a database as described below.

In one embodiment of the present invention, one or more of the device manufacturer, wireless service provider, subscriber, or end user may configure what entity is contacted upon actuation of a panic button. For example, call routing may be variable based on safety network or other settings, for example, which personal contact, call center, PSAP, or emergency first responder is closest or available. Upon activation of a panic button or call to an emergency number the routing of contacts to one or more of these entities may be configured, set to a default, or calls or contacts may be routed according to configurations implemented in the telecommunications network to which the device is connected. In a preferred embodiment, upon actuation of a panic button, a call is not connected, but data configured on the telecommunications device is sent through one or more telecommunications networks to one or more members of a safety network.

In a preferred embodiment, one or more members of a safety network will be provided the location of a device which has had its panic button activated or which has called an emergency telephone number. The location may be provided via one or more methods of two-way, broadcast, or multiparty communication as described below. The device location may be determined using one or more of navigation and positioning technologies such as, for example, Global Positioning System (GPS), wireless networks, cell towers, and other navigation and positioning technologies.

In a preferred embodiment, upon activation of a panic button or initiation of an emergency telephone number, one or more members of a safety network may be notified or contacted and communicatively connected to each other and/or the user of the device in a two-way, broadcast, or multiparty communication, for example, by phone call, Internet chat, conference call, group e-mail, SMS or other text-based message, or other real-time or asynchronous communication. In a preferred embodiment, information stored on the device, and/or information configured in a preferably network-accessible database and containing one or more entries associated with the device will be transmitted in a standard format usable by a PSAP or other emergency responders. In an additional preferred embodiment, information stored on the device, and/or database information associated with the device will be accessible to members of a safety network associated with the device. Preferably this information would be accessible through a communications network such as, for example, the Internet, or, by one or more members of the safety network who may have direct or remote access to the database.

For example, all members of a safety network may be given permission to access a specialized and unique webpage to coordinate all emergency activity related to a device. In a preferred embodiment, for example, if a panic button is actuated or emergency telephone number called, the incident may be routed to emergency responders such as the nearest police department or PSAP, a call center may be placed into a conference call with the emergency responders and one or more members of the safety network associated with the device; one or more of emergency responders, call center, and members of the safety network would access a webpage that could coordinate all emergency activity instigated as a result of the actuation or call. In addition, in a preferred embodiment, a call center or PSAP may contact professional experts experienced in the type of incident that precipitated the emergency contact, and may choose to individually communicate with these experts or contact them for the purposes of adding them to the conference call or other multiparty communication.

In one embodiment of the invention, the wireless device may be configured to notify one or more default parties in the event of panic button or emergency telephone number actuation. For example, a wireless device may be configured to contact school safety officials or other school system representatives or public safety representatives in the event of an emergency actuation such as a panic button or emergency telephone call. In one example, a school system may subscribe to a panic button service and distribute to end-users consisting of students and/or other members of the school community devices preconfigured by the wireless service provider or by the school system to contact one or more individuals designated to handle student related emergencies.

In another example a wireless device may be configured to contact different members of the safety network depending on the device location, time of day, or position in relation to other devices or subscribers. For example, a wireless device provisioned to a student could be configured to contact school safety officials during the school day or when the device is on school grounds, contact specific individuals who live, work, or are otherwise situated in preconfigured locations or whose wireless devices have been configured to report their location and which are in proximity to the student's wireless device, or to contact a default list of friends or family outside of the school day or when the devices in an unrecognized location.

In another example, a wireless device may be programmed to trigger an alert if the device travels outside of a certain zone or into a zone which has been designated, for example, as off-limits, dangerous, inappropriate, or otherwise meeting a location-based or location and time-based threshold. In another example a wireless device may be configured to report its position periodically or continuously. A wireless device may report location-based data that it generates through a wireless and/or other communications network to a server, where it may be stored in a database local or remote from the server and/or displayed on a webpage associated with the wireless device as described above.

In other words, a webpage associated with the wireless device or with a subscriber or end-user may be configured to compile all emergency activity and/or to collect other information about the subscriber and/or user, such as location-based information, information related to the subscriber, user, or device safety network, parents or guardians, vital information of the subscriber and/or the end-user such as name, organization name, address, picture, gender, hair color, eye color, ethnicity, current height & weight, date of birth, or other identifying information (for example, fingerprints and/or footprints, DNA, eyeglasses, braces, pierced ears, birthmarks, or other physical or identifying characteristics), medical conditions or information such as allergies, current medications, any special medical concerns, blood type, medical contacts that can be immediately connected during an incident to any conference call or other communication, languages spoken, known threats (for example, non-custodial parents or prior incidents), off-limits areas, and other information which may be helpful in an emergent situation or to otherwise help ensure a user's safety. Vital information may be stored within the wireless device and/or in a central database. A subscriber or end-user may limit what information is initially released to one or more responders to a panic button actuation; this information may also be released after receipt of an alert, for example, if an organization other than a parent or guardian is a subscriber for end-users who are minor children, after a panic button is actuated and the necessary steps towards her mediating the situation that caused the child to actually panic button are the underway, parents may later authorize the release of vital information to law enforcement agencies and emergency personnel.

A subscriber can always update the vital information associated with the end-user of a wireless device. For example, a subscriber such as a parent may always update the current photo of the end-user for example their child. Updates may be accomplished using the wireless device, for example taking a picture using an embedded camera or using inputs of the wireless device, by entering updated information into a computer directly connected to the wireless device, or by entering information into a network accessible resource such as a webpage. In a preferred embodiment, the emergency safety system service provider will periodically remind the end-user or subscriber to update threat levels and/or vital information. These reminders may be sent via e-mail or other text-based message, pop-up reminder, or through an audio reminder such as a phone call, voice message, or audio file played through the device. For example, the emergency safety system service provider may remind parents, guardians, school system officials, or other supervisory adults when a photo update is needed based on an update schedule for a child user's current age as stored as one item of the vital statistics.

Vital information about an end-user and/or subscriber may be stored in the wireless device and/or on the server. The information may include hair color, eye color, current height & weight, date of birth, blood type plus identifiers such as eyeglasses, braces, pierced ears, parent or guardian information, other contact information, school contact information, allergies and other medical information, current photograph. A user or subscriber can update the end-user's current photo using a website or the device's camera feature (if available). Users or subscribers may be sent a reminder on a schedule based on user configuration or a default schedule when a updates are needed to photos, height, weight, and physical descriptions.

Multiple photos may be used so that a high quality photo (such as that taken by a school photographer, scanned, or taken using a digital video camera) can be stored as well as photo made using a camera integrated into a wireless device to capture what an end-user is currently wearing or tends to wear.

In a preferred embodiment, temporary information on vital statistics may also be stored. For example, a parent may capture what their child is currently wearing by updating photos using an embedded camera, which may be important if a child is entering a large public area such as a shopping mall, theme park, concert, or airport. In another example, a parent who is traveling or merely leaving a child with a babysitter may store information regarding the best emergency contact person for the limited and specific period of time the parent is unavailable.

Medical information can include allergies, current medications, and any special medical concerns; reminders to update medical information can be sent on a configurable schedule but preferably yearly. Update requests may be tied to regular events such as yearly physicals, childhood checkups, or school-required vaccinations. Law enforcement agencies and emergency personnel may receive any information about an end-user or subscriber stored on the server or the wireless device immediately upon receipt of an alert or manually upon request by an end-user or call-center. In the case of an end-user who is a minor, a parent or guardian may choose to release vital information in case of an alert or manually.

In one embodiment of the invention, after a panic button is actuated e-mail, SMS messaging or other text-based messaging is used to trigger emergency assistance from an end-user's or subscriber's safety network and/or public safety personnel, and e-mail, SMS or text-based group messaging also updates stakeholders such as members of the safety network or family, and public safety personnel during an emergency incident in real time. Messages may be segregated so that they are sent only to recipients in particular categories, for example, only to public safety personnel or only to family. Among the information that may be compiled through a database or other centralized data collection system is incident video, audio, and pictures collected from recording equipment embedded in the wireless device or from other sources available to public safety or call center personnel. Collecting in one place all available data about an incident and the end-user of the device that triggered an alert and providing the data to all stakeholders may facilitate the efforts of public safety personnel and other first responders, or in some situations, obviate the need to involve public safety personnel at all.

For example the present invention provides a set of proactive safety tools that can be used by subscribers and/or end-users to avoid or mitigate dangerous situations. A service provider may collect information relevant to the safety of a subscriber or end-user, such as sex offender locations, violent crime areas, industrial zones, and other areas that are dangerous or of concern. This information can be provided on a website or directly to a wireless device in map, list, or other form, and the device can alert an end-user when they are approaching or in one of these areas. Alerts may consist of visual, tactile, and/or audio signals, and may vary depending on the degree of threat and the device's proximity to the area of concern. In another embodiment the wireless device may send an e-mail text message or other notification to one or more members of a safety network or other designated individuals or organizations when the device is in a preconfigured proximity to the area of concern.

In an additional embodiment, information about different types of threats may be shown separately depending on user selections of links or options. For example, sex offender locations and other danger areas may be contained on the emergency safety system service provider web site, an alternate site, or may be transmitted to a computer, wireless device, or other handheld device upon request or by configuration.

In one embodiment, parents, guardians, school officials, and other stakeholders may track the location of a child through a wireless device using location-based technology such as GPS-tracking capability which is embedded in many modern wireless devices. As explained above, the information collected by the provider about threats and device location may be provided on a password-protected website accessible to the stakeholders either for a single end-user or in aggregate form for multiple end-users.

Subscribers and users and other members of the service providers', subscribers', and users' community such as members of safety networks may log in to a website furnished by the service provider and identify and characterize areas that pose potential threats to users' safety. The service provider may use a formula to provide representations of the level of threat in a geographic area. These representations may be displayed on the provider's website, and may be tailored to the password-protected website associated with the wireless device. In addition, the provider may send periodic updates summarizing the location of the wireless device since the last update or for some other period of time, and inform the end-user or subscribers such as parents or guardians if it has been near any danger zones via e-mail, SMS, or other text-based messaging, or through audio updates for example voicemail, or interactive voice response (IVR). The updates may also, for example, detail changes to threat areas, summarize dangerous incidents reported by community members, or incorporate messages provided by local public safety or other officials.

Subscribers or system administrators may identify areas that they know are dangerous using a website or using the wireless device or other device. The wireless device may also be used to identify that the current location is dangerous. Areas designated as dangerous by end-users, subscribers or system administrators are called "Danger Zones". These danger zones may be incorporated into the danger formula which may affect the threat level. This allows subscribers to access information about which areas may be dangerous.

A panic button may be activated by a user as follows. A user may activate an input on the device such as a button. A person of skill in the art would understand that the input that initiates the panic button may be any input which the device is capable of and programmed to accept, for example a touch screen or voice command. As an alternative, a user may text a code to a service provider. In a preferred embodiment, the code is the word "HELPME". In a preferred embodiment, when a panic button is activated by wireless device, members of the user safety networks such as friends, family, and neighbors will be notified immediately. If these friends, family and neighbors do not respond within a short period of time, the situation will be escalated to a call center managed by the safety system service provider or by another party. If the call center cannot resolve the emergency or situation that prompted the user to activate the panic button, the alert may be escalated to the nearest public safety or supervisory entity such as a police station, school public safety official, or principal's office.

In a preferred embodiment, after a panic button is actuated one or more tasks may occur simultaneously. For example, the safety system service provider may execute an emergency escalation procedure, and emergency communications server provided by the service provider may coordinate all text-based and voice communication to the subscriber's safety network, the emergency communications server may determine if additional resources should be joined to the safety network and therefore included in voice and text-based communications (for example, subject matter experts employed or affiliated with the service provider or a call center representative), and personnel at a call center may work to resolve the incident. Call center personnel may also record incident status and other information, for example, notes, into an incident record. In a preferred embodiment, all data gathered electronically from wireless devices, PSAPs and other public safety organizations, and entered by call center personnel or subscribers will be time and date-stamped and maintained as a record of the incident.

Following actuation of a panic button an emergency escalation procedure may occur in conjunction with other tasks as follows. If available, video streaming from the wireless device is immediately initiated and send via wireless or other indications network to one or more members of the safety network (which may include a call center operated by a service provider) and public safety personnel; the video may also be made available via a password-protected website associated with the wireless device or the subscriber; and may be recorded at the wireless device and/or a server accessible from the telecommunications network. In addition, the wireless device may send a message to a messaging server provided by the emergency safety system service provider. The message may include information such as the most recent contact information stored on the device; in one embodiment the contact information may already be stored on the server. In one embodiment, if contact information is stored on both the wireless device and on the server and the information does not match, the information entered latest-in-time is used. In another embodiment, information on either the wireless device or on the server may be deemed accurate. In another embodiment, the information may be combined.

Contact information is transmitted to the emergency communication server, which opens a voice communication conference between the wireless device and one or more members of the subscriber's safety network, which may include a call center. Members of the network and/or call center may connect to the conference via a landline, wireless device, voice over IP, or other device capable of being communicatively connected to the wireless device via one or more communications networks. The emergency communication server may compose and transmit text and email messages to all one or more members of the safety network and/or contacts. The message may include one or more of: a link that when clicked joins the person to the voice conference, a text or other visual indication that the communication regards a panic button incident, the name of the end-ser, location of the wireless device in coordinates such as latitude and longitude and/or street address, and a link to a web page with contains vital information about the end-user and the incident.

The wireless device may send another request to the messaging server requesting contact information for any person or contact (for example, a neighboring business) who is subscribed to the emergency safety service and has opted in to "be a neighbor" and is within a preconfigured radius, preferably within 1 kilometer, of the location of the end-user who has pressed the panic button. The contact information is downloaded to the wireless device and "neighbors" are sent the same text-based messages as the members of the safety network and parents or guardians.

All text-based and voice communication resulting from actuation of a panic button is managed by the emergency communication server. Guardians, members of the safety network, and neighbors are given a limited amount of time to respond to a panic alert by entering a "resolution" code on the incident, or by verbally explaining the resolution to the service provider's call center. At any time during this period of time they can also enter an escalation code which immediately escalates the incident to a PSAP. The period of time may be configured by a subscriber, end-user, or service provider, but is preferably three minutes and preferably not longer than seven minutes.

If after the preconfigured period of time the situation is neither resolved nor escalated a call center will attempt to resolve the incident by contacting the end-user through the wireless device as well as contacting parents, guardians, or a designated contact in order to confirm the status of the emergency. If the call center is unable to contact the end-user or another designated party or the situation is still not resolved the incident is escalated to a PSAP. Under certain conditions, experts for example doctors or translators, may be connected to a voice conference call by the emergency communications server. Experts may be connected if certain options have been selected by an end-user or subscriber, for example, a preference for foreign language or a configuration for additional panic button to be triggered in case of medical emergency. In a further example, a call center representative may initiate inclusion of an expert in a conference call. Alternatively, information regarding the incident such as that that would be compiled onto a webpage associated with the wireless device, as described above, may be forwarded to an expert or an expert gatekeeper may determine if one or more experts are required, or send advice or other information helpful in determining if the incident is an emergency or in resolving the incident altogether.

In one embodiment, some or all voice and data collected subsequent to the actuation of the panic button is transferred to the nearest PSAP, or alternatively to public safety personnel capable of resolving the incident. For example a PSAP or public safety personnel may be connected directly to the wireless device or to the conference call initiated by the emergency communications server. If the wireless device is connected to a ASAP or other dispatch agency (for example, to a police station or school public safety official), the call taker at the dispatch location determines the personnel to deploy to the incident. These personnel may be connected to the incident by the emergency communication server with and provided access to collected voice and data through the aggregating website or through another website provided by the emergency safety system service provider. In a preferred embodiment personnel may be routed to the incident or subscriber location in real time using location-based information transmitted by the wireless device on an ongoing basis. In another embodiment personnel may be routed using location-based information transmitted by the wireless device at the time the panic button is actuated.

Other embodiments of the panic sequence and escalation sequence may be implemented. For example, For example, the structure of individuals and organizations contacted in the event of a panic alert may be altered, and/or other steps taken for a panic button sequence and escalation may differ. For example, when faced with dangerous or uncomfortable situations, an end-user may press a button or combination of buttons on their wireless device and initiate an escalation sequence as described above or alternative sequences. For example, a sequence may have administrator, subscriber, or user configurable intervals during which particular tasks or inputs are expected.

For example, if safety network members or designated Guardians do not respond within a configurable amount of time, ideally three and preferably less than sixty minutes, the incident may be escalated to the emergency safety system service provider's call center (if not included in the initially contacted safety network members or Guardians), or in another embodiment, directly to the police station or other public safety service provider that is both nearest to the location of the wireless device and accessible at the time the escalation occurs. If the call center is contacted and cannot resolve the emergency ideally within two minutes and preferably within one to fifteen minutes, the emergency may be escalated to the police station or other public safety service provider both nearest to the location of the wireless device and accessible at the time the escalation occurs.

In another embodiment, when the designated panic button is pressed it initiates the panic sequence. This sequence may vary depending on a variety of factors. For example, if the contact information stored on the wireless device was not updated within a period of time not greater than thirty days, a message is sent to the server to retrieve the most recent safety network or Guardian contact information. If the contact information is new, or if the server is not accessible or does not respond appropriately, this step may be skipped.

If the server is successfully contacted, safety network or Guardian contact information is downloaded to the wireless device. If the server is not contacted or not available, safety network or Guardian contact information already in the device may be used. Additionally, safety network or Guardian contact information may be updated periodically from the server to the wireless device regardless of whether the Panic Button is used.

The wireless device may compose and send text or email messages directly to one or more safety network members or Guardians, and/or the server or another server may send email or text messages to safety network members/Guardians. A text-based message may include one or more of the following: an indication that this is a Panic Button incident, one or more pieces of identifying information such as the name and age of the end-user, location of the alerting wireless device in either or both latitude and longitude and street address, and a link to a web page which contains vital information about the end-user and the incident. Other information may also be included such as system status alerts, danger level at the location of the device, and the identity of the other people contacted in connection with the incident. In addition, a picture of the end-user may be sent in a video or picture message.

The wireless device may request the server for contact information for any person who is subscribed to the safety service, has opted in to "be a neighbor" and is within a configurable radius of the location of the end-user who has pressed the panic button, preferably within 5 kilometers but configurable or variable based on factors such as location density, density of neighbor subscribers, and danger level of wireless device location. The wireless device may request neighbor information in the same request for safety network or Guardian contact information or a separate request. If the server is available and successfully transmits to the wireless device, contact information is downloaded to the wireless device and neighbors may be sent the same text-based message as safety network members or Guardians. If the server cannot complete the transmission with the wireless device, the wireless device may send an alert to a pre-designated group of individuals or organizations who are safety network members/Guardians, such as school administrators or people or organizations pre-designated on the wireless device as located near the end-user's current location, and/or the server may send the same text-based message as that sent to the safety network members/Guardians.

Following actuation of a panic button, neighbors and safety network members/Guardians have a configurable or variable time of preferably one to ten minutes to respond to a Panic Situation by entering a "resolution" code on the incident. At any time during this interval they can also enter the escalation code which immediately escalates the incident to a PSAP or other emergency services.

If after the safety network members/Guardians and neighbors have been contacted and the situation is neither resolved or escalated within the pre-configured intervals, and/or there is a failure to communicate with the wireless device after the panic button is pushed, a call center is notified. Based upon variables such as nearby danger reports, the threat level of the end-user's location at the time the panic button was actuated and at its last known location, previously reported incidents, or other policy, the call center may attempt to resolve the incident by contacting the end-user and safety network members/Guardians to confirm the status of the emergency.

If a call center cannot resolve the incident, either immediately or preferably within a set interval of between one and five minutes, it is escalated to a PSAP or other emergency services. Data may be transferred to a PSAP or other emergency services as configured by the system administrator.

In one embodiment, when an emergency telephone number such as 9-1-1 is dialed from a wireless device that has the emergency safety system software installed on it, the "emergency escalation" procedure described above will be invoked. In another embodiment, when an emergency telephone number is dialed the wireless device will connect through the local emergency telephone number system, but one or more of the tasks described above will be performed as allowed by the limitations of the device or the networks in proximity to it, for example, video may be streamed from the device, or a call center may be connected to the call in a conference with an emergency telephone number dispatcher rather than the device connecting only to the dispatcher. Because in the present invention some incidents begun by a panic button actuation or emergency telephone number call may be handled by a call center or member of a safety network without referral to a PSAP, and in other instances an incident may be avoided altogether through use of proactive safety tools, the safety network, call center and/or escalation procedures of the present invention have the benefit of reducing the emergency telephone network traffic load and false positive calls.

In one embodiment of the invention, if the location of an incident is not available or accurate, if, for example, the subscriber's wireless device is not equipped for location-based services, the location-based services are not available, or the incident is not occurring where the wireless device is located, call-center personnel may work to determine the location of the incident and record the information on a website or other network accessible resource associated with the subscriber or incident so that safety network personnel, PSAP personnel, and other stakeholders have the most accurate information available.

In one embodiment of the invention a subscriber may be given the option to "be a neighbor" so that they may assist if a panic button is pressed within a pre-configured distance from their location. The location may be based on a home address, work address, or different addresses depending on the time of day, or may be the location of a wireless device loaded with software that allows the emergency safety system service provider to monitor its location. Whether neighbors are alerted in addition to safety network upon actuation of a panic button may be configurable. In a preferred embodiment of the invention, if this option has been selected, when a panic button has been actuated and the "neighbor" subscriber is within a 1 kilometer radius of the location where the panic button was pressed, that subscriber may receive a text-based message with information regarding the end-user who has pushed the panic button. If the neighbor acknowledges the message by, for example, replying to text-based message or dialing a phone number that may be transmitted with the text-based message and inputting a code transmitted with the message, the emergency communication server may connect the neighbor to any voice and text-based conferencing related to the incident. In an alternative embodiment, one or more neighbors within the preconfigured radius may be conference in the incident without acknowledging the original text-based message.

If enough individuals or businesses elect to be a neighbor and to be alerted at their physical addresses and/or wireless devices when an incident occurs in their location, a "virtual neighborhood" can result. A virtual neighborhood is a safety network of static physical addresses and location-based wireless devices belonging to people within a geographic area of an incident who may not otherwise be included in the safety network of the subscriber who sent an alert (for example, strangers, other non-relatives, a neighborhood watch). Subscribers and neighborhood members may respond to local incidents, contribute information on threats and other safety information regarding locations they frequent to information databases, connect to one another, and suggest solutions to safety problems in the locations they frequent, for example through a blog. The members of a virtual neighborhood (which may be periodic or temporary) despite being otherwise unknown to each other can work together to protect their physical locations, coordinating safety procedures and responses around a location.

When configuring a subscription account system subscribers may opt in or opt out of the "be a neighbor" option. Non-subscribers may be invited to be a neighbor by a subscriber, through a pop-up message used location-based notification software, or may become neighbors through a website or other network accessible resource. End-users or subscribers such as parents or other system users may opt to allow the assistance of neighbors if the Panic Button is pressed. If the neighbor subscriber is within a configurable radius of the location of the device where and when the panic button is pressed, preferably within 5 kilometers but configurable or variable based on factors such as location density, density of neighbor subscribers, and danger of location, then that subscriber will receive the SMS text message from the person who has pressed the panic button.

In order to provide the proactive safety tools described above, the emergency safety system service provider may collect information relevant to the safety of subscribers or end-users and use the collected information to calculate the level of danger in the physical locations for which information has been collected. Information may be collected from a variety of sources, including panic button actuations or emergency services number (e.g. 911) calls from a particular location or area, user or subscriber reports, or designations of areas of concern for individual use, reports from police or other public safety officials, or other sources, for example, third-party databases.

In a preferred embodiment, local crime information is incorporated in the data collection. For example, the service provider may periodically download crime information from one or more databases maintained by municipalities or other government bodies, public safety organizations, police departments, federal agencies, or other third parties. In a preferred embodiment, threat analyses would be updated in real time as additional information is collected, and notifications would be sent as configured or necessary as soon as the analyses are complete. For example, if a public safety organization issues a broadcast alert regarding a general or specific threat, text-based messages, robo calls, voicemail messages, pop-up alerts, or other forms of notification messages may be sent to subscribers as soon as the emergency safety system service provider receives the alert from the public safety organization. In addition, any visual, audio, or tactile displays of threat information may be updated in real time and presented to an end-user or a subscriber on a wireless device or via website or other network-accessible resource.

The safety system service provider may also make a website accessible for community members to add to the information collection. In a preferred embodiment a formula is used to determine the level and type of threat in any given area. In a preferred embodiment the formula takes into account user defined danger zones, sex offenders, various types of crime, and any situational information like fire, flood, tornado, hurricane, and other manmade or natural disasters. Using the formula a mapping server provided by the safety system service provider can calculate the danger at a specific location which is may be, for example, the current location of an end-user, locations between an end-user and an intended destination, areas frequented by an end-user, or a default location. The mapping server may also provide maps indicating areas of concern and may suggest alternate routes or indicate when an end-user comes into proximity with or crosses an area of concern.

For example a user may use the software installed on their wireless device to take preventative measures to avoid danger. The application installed on the wireless device may use a formula to calculate in real time a threat level at the location of the wireless device as well as, as described above, other locations that are likely to be frequented by the end-user, giving the end-user the opportunity to anticipate a dangerous situation and avoid it. In addition the end-user may deem certain threats or certain threat levels of lesser or greater concern and act accordingly. In other words, if a higher threat level is displayed the user may differently than if a lower threat level or a threat level of a different type is displayed in a location.

In a preferred embodiment, the end-user, subscriber, or other stakeholders may be sent periodic summaries of the threat levels in areas frequented by the wireless device. These summaries may include information such as location, time, and date of updates or incidents that precipitate a threat level, and may cover incidents for a pre-configured span of time or cover areas visited by the end-user in a pre-configured window prior to the transmission of the update. In one embodiment, a stakeholder such as a school district may receive aggregate reports for all end-users associated with the stakeholder, which may also be the subscriber or which may have been given permission to access the information for end-users not under the stakeholder's subscription. In a preferred embodiment, aggregate information may be "drilled down" to identify individual end-users or types of end users (for example, freshmen or upper classmen), or to isolate end-users' or locations' proximity to specific types of threats such as violence, gang activity, sexual predators, etc.

In a preferred embodiment the threat level allows real-time measurement of danger, constant monitoring of threats near the wireless device or locations frequented by the end-user, automatic identification of places to avoid, and details of why an area is dangerous. In addition, using GPS or other location-based routing or mapping tools, the threat level can be used to provide walking or driving directions that avoid dangerous areas. The formula used to determine the level of danger in a physical location can be adjusted based on various factors.

Location-based preventative measures to avoid danger are one tool that may be incorporated into a safety system. Which preventative measures are suggested may vary depending on the time of day and other factors. For example, suggestions are generated by the software using the danger formula to calculate a threat level at the location of the subscriber wireless device, or at the location of a planned route as available from a route planning program on the wireless device or on a website. This gives subscribers and end-users the ability to plan for and avoid danger in the current, frequented, or planned location of the wireless device, or plan a route at another time of day. The higher the threat level the greater the danger. Threats may be classified by type, frequency, age, or time of day.

In a preferred embodiment, a threat level may be broken into the types of threats used in a danger formula that calculates a general threat level so that specific types of threats can be assessed. For example, the proximity of sex offenders may provide a good indication of the threat level of the specific types of threats likely to be of concern to a particular subscriber to an end-user. In addition to incorporating threats of various types into a danger formula the service provider may also display individual types of threats in a map or other visual or auditory format (such as a meter or "Geiger counter" sound that varies based on proximity to threats). For example, the location of known sex offenders may be displayed relative to an end user's location. Sex Offender proximity to a subscriber or end-user's location may be included or excluded from the danger formula calculation depending upon the sensitivity, age, or gender of the user.

In addition, an end-user may be notified via text-based message, webpage update, e-mail, voice message, or pop-up warning screen, if a threat level is updated in real time that increases the threat level in proximity to the wireless device or in a location likely to be frequented by the end-user. The software may also send automated messages to subscribers listing the threat level location, time, and date over a configurable period of time from one day to six months. The messages may be automated, on demand, or configurable.

In a preferred embodiment, community members such as subscribers, neighbors, end-users, and other stakeholders can update threat areas using a visual tools such as a map to identify locations or areas they know are dangerous. These areas may be published to other community members in a format such as a webpage or other network accessible resource configured to allow other members to confirm or reject the degree of danger the area presents by applying their own rating to the area. For example, updates to threat information may be posted in a blog like format with space for commentary to the site or below information updates. These ratings may factor into the level of danger each area presents. In one embodiment of the invention, an end-user, subscriber, or other individual with access to displays of threat areas or danger zones may segregate the source of information upon which the analysis is based. For example, a user may choose to only see threat levels that are based upon official sources such as police crime databases and ignore user ratings, or in the alternative limit analysis to those areas that have received a lot of feedback from community members.

Crime information may be obtained from police databases, subscribers, or other sources. Information about crime may include the frequency, currency, density, and type of crime. Local crime information may be incorporated into the danger formula for the subscriber's or end-user's current, frequented, or planned location. Crime data may be displayed in a map on the wireless device or on a website.

Although in a preferred embodiment a threat level will decrease the longer the interval between reported incidents were threats, in a preferred embodiment a user may also configure the analysis to be limited to more recent threats, for example, within a few days, a few weeks, a month, or a year. In some embodiments the rate at which a threat level declines may depend upon the type of threat. For example, in a preferred embodiment, threat levels based on the location of known sex offenders may not decline or may decline extremely slowly.

The safety system may include one or more web interfaces or other network-accessible resource that provides access to one or more tools or informational pages that draw data from one or more devices in the system. For example, a webpage or other network accessible resource may be used to coordinate or compile all information related to the end-user of the wireless device and/or all information helpful to resolving an emergency. In an emergency it is important to coordinate all stake holders of the crisis including the person in danger, their safety network, other friends and family, a service provider call center, a PSAP, and all other emergency service personnel (e.g. PSAP/emergency phone number/911 call taker, PSAP/emergency phone number/911 dispatcher, police, fire, and ambulance services). The webpage or other resource serves as a single information source that is available and accessible to all stake holders.

One or more web pages or other network accessible resources may be used to accomplish this coordination for example one webpage in a show all vital statistics as well as panic-button incident-related information, or separate resources may be provided for example a default webpage, as well as a webpage dedicated solely to coordinating panic button response. Although the preferred embodiment is a webpage, additional embodiments may be implemented and may coexist, for example a webpage may display information obtained from the safety system service provider's database, and/or information from the database may periodically be sent to members of a safety network or other stakeholders via text-based messaging such as SMS, interactive chat, e-mail. RSS feed, pop-up, or other text-based messaging, or such information may be conveyed during a robo or IVR call, or conference call with primary and/or additional stakeholders.

The network accessible central repository may also provide access to a log of all activity recorded following actuation of the panic button or panic button sequence which may be displayed in sequential order and/or separately display different types of information. For example the central repository may include one or more of text based messages such as SMS or e-mail sent from the activated wireless device, GPS location at which the panic button was activated, location of the activated wireless device, information entered by stakeholders via the webpage or other medium, escalation information including the capability to escalate the incident, vital information such as that described above, and video, still images, and/or audio sent from the wireless device over one or more networks. Such information may be displayed in sequential order and/or in order of importance, and may be displayed on one or more web pages or other locations accessible from a main incident page or from each other. Such messages and information may also be broadcast/rebroadcast to all stakeholders via e-mail or other text-based messaging, or certain portions may be sent in their original format, for example video sent from the wireless device may be rebroadcast to stakeholders as streaming video. Once an incident has been resolved incident status may be stored for future review by stakeholders, for future forensic research of the incident, and/or to allow the emergency safety system service provider to improve the system.

In addition to providing panic button tools, the emergency safety system service provider may also provide tools that can be used by subscribers when they feel a panic alert is not yet necessary but they feel worried or uncomfortable. For example, a subscriber may use a smart phone to photograph or take a video recording of a location a person or whatever is causing or your discomfort. Using the software provided by the emergency safety system service provider, the video audio or images can be automatically streamed to a safety network and or streams to a server where it is stored with the time/date stamp and accessible through the subscriber's account on the emergency safety systems service provider's password-protected website or other network accessible resource. Another use of this tool may be for subscribers to record suspicious activity or criminal behavior that they witness but are not involved in. A subscriber may then decide later to report the activity and have objective evidence of the time, place (using location-based technology), and/or actual events. If multiple subscribers are present at an event, recordings of the same incident from multiple subscriber wireless devices may be coordinated using software tools and/or compiled and sent to PSAPs or other safety organizations.

Where necessary, requested, or helpful to providing the proactive and interactive tools of the emergency safety system, email updates regarding threat levels, danger zones, incidents (when a panic button has been pushed or emergency phone number dialed), or other information may be provided in user or administrator-configurable intervals such as never, daily, weekly, bi-weekly, monthly, on demand, or if a trigger event occurs. Such updates may summarize the location of a given wireless device during a preset or chosen interval, and/or inform one or more stakeholders if the device has been near danger zones or other areas designated by a parent, subscriber, other stakeholder, or system administrator; updates may also aggregate information from multiple wireless devices for subscribers with permission to access data from more than one device, for example, a school safety administrator, organizational manager, or other stakeholder. In addition, the email summary may be supplemented or replaced by an Internet-based summary available upon log-in or upon selecting a link included with the email or other message.

An important aspect of the present invention is the ability to successfully integrate with existing emergency telephone system legacy infrastructure, processes, and methods such as CADs, ANI (Automatic Location Identification), PANI (Pseudo Automatic Number Identification), ANI (Automatic Number Identification), selective routers, VoIP Positioning Centers, and other existing enhanced emergency telephone number systems.

In particular, is extremely important that the most accurate location-based information available from a wireless device is transmitted to a PSAP or to a call center through existing ANI/ALI data exchange process; included with this transmission should be the most accurate and detailed subscriber information available; also, the most real time and accurate situation information should be made immediately available to the PSAP.

Because there are existing standards that the majority of emergency service providers adhere to, this information is transmitted from one or more emergency servers of the present invention to at least one PSAP using standard formats. For example, in addition to required fields the existing ALI standard allows for some flexibility in the information that can be sent between service providers and therefore displayed by CADs. Example fields may include a community name field, an address number, a call back number field, a street name, military or standard time, the state from which the call originated, and emergency service number (ESN) which identifies the PSAP, a class of service, a date (which is useful for recording purposes to document the call), a VoIP positioning center (VPC) number used to route voice over IP calls to the correct PSAP, a customer name field, an English-language translation (ELT) number (sometimes called a "tell-tale" or "agency file") (an alphanumeric description of the primary first-responder agency associated with a given emergency services zone/number such as law enforcement, fire and emergency medical service agencies, and may include their station number (for dispatch purposes) and telephone number), the latitude and longitude, uncertainty factor and confidence factor of a latitude and longitude, and Emergency Service Query Keys (ESQKs) or in the case of VOIP and Wireless pseudo-ANI (pANI) to route to the correct PSAP.

Despite the flexibility of ALI formats there was no mechanism for providing the enhanced information available from wireless devices to PSAPs or other public safety providers because it was not understood what format the information could be transmitted in or in what channels or how it could be delivered to the PSAP.

In the present invention, a community name field may be used to identify the emergency safety system service provider, a supplemental field may be added to provide the URL or other contact information of the emergency safety system provider, the class of service field can be used as a trigger for mapping the latitude and longitude onto CAD systems at the PSAPs, and other supplemental or standard fields may be modified to enhance the information given to operators at PSAPs. The flexibility of the ALI system means that although different phone types may transmit different types of information, the format can be adapted to display different types appropriately within the same system. For example, when a land-based phone is displayed at a PSAP, the location is an address. For a wireless device, the location is a coordinate such as latitude and longitude.

One aspect of the present invention is that using a standard SIP protocol a correctly formatted ALI message may be transmitted between an emergency safety system service provider and a PSAP or other public emergency service provider. Because it is possible to adapt legacy systems to accept SIP messages, the most accurate location-based information that can be generated from modern wireless devices may be transmitted from a wireless device through a subscriber service or other server-based system to a PSAP. In particular, the latitude, longitude, uncertainty factor, and confidence factor were previously unavailable from wireless devices. In addition many CADs required a phone number to locate an address, which was not available when a panic button, for example, or other alert was generated by a wireless device, because in order for location-based services to work in legacy systems the phone number was with the location of the nearest cell tower. However, it is possible to add flexible fields that can be accepted by ALI systems and transmit them through SIP channels to PSAPs because the ALI systems already accept SIP signaling.

In one embodiment of the present invention, when a call is delivered from an emergency safety system service provider to an emergency services telephone (e.g. 911) dispatcher an incident ID and URL or network address are displayed on the ALI screen. In one embodiment, by accessing a web page or other network-accessible resource at the URL/network address and entering the incident ID the dispatcher can retrieve in-depth subscriber information including GPS or other coordinate-based location of the wireless device, vital information and photographs as described above, incident audit log, SMS or other text-based messaging broadcast capability of the wireless device, and any available audio and/or video stream. In another embodiment, accessing the URL will direct the dispatcher directly to the incident webpage. In one embodiment, an new incident web page may be started each time a panic button is pressed from a wireless device. In another embodiment, historical information from other incidents or activity on the device may be included on an incident webpage.

In one embodiment of the invention, a latitude and longitude of a wireless device as well as information regarding one or more confidence factors for the location may be included in AL I display sent to a PSAP. The PSAP may use reverse geocoding to resolve the latitude and longitude to a street address or other physical location, or may plot the latitude and longitude visually on a map. In another embodiment, the emergency safety system service provider will use reverse geocoding to resolve the latitude and longitude to a street address, mapped point, intersection, landmark, or other coordinate system and transmit the information to a PSAP.

A person of skill in the art will appreciate they call center may be connected to a PSAP using existing systems designed to accept emergency telephone calls from VoIP callers and other telematics applications such as vehicle accident notification systems. An application installed a wireless device is configured to contact a safety system service provider. From the safety system service provider the call can be routed using the same legacy systems used to connect the above-noted VoIP and telematics systems to PSAPs and other emergency service providers. For example, in one embodiment, once a connection is made between the wireless device and a server at the safety system service provider the communication may be connected to a call center and/or directly to a voice positioning center (VPC). A connection is then made between the VPC and Emergency Service Gateways or ESGWs through emergency telephone system providers such as HBF, Intrado, TCS, VIXXI, T-Mobile, Sprint, etc. The ESGWs may then route the call through an TUC or other carrier and through enhanced MF trunks to a PSAP. This is one example of the type of connection that can be made to a PSAP. Connections may also be made through a landline, private branch TN, and through the cell phone tower network (for non-subscribers), and other previously existing systems. The ALI message sent to the PSAP systems may vary depending upon the class of service available from the connection path. For example, a landline may be associated with a physical address, but as previously described a wireless device may have latitude, longitude, and/or other coordinates.

As discussed above, legacy emergency telephone number systems relied on phone equipment located at a fixed address. Because most VoIP systems are installed at physical locations, the VoIP emergency telephone number system relies on pANI coding to reflect a physical address, and transmits the pANI information to the PSAP in a SIP header. By modifying a SIP header to reflect latitude and longitude, and/or providing additional information through conventional ALI formatting, the present invention allows the pinpointing of wireless devices and additional flexibility for wireless devices that are in motion. Instead of using a physical address that is tied to the subscription, for example the billing address of a telephone number, the present invention transmits the actual latitude and longitude of a wireless device.

Incident information is stored on the emergency safety system service provider's incident server. Once an incident is completed, historical data such as text, audio, images, and video can be retrieved via one or more web pages, for example, from the incident web page. Different user types may have access to different types of information and it may be shown in different formats; for example, PSAP personnel may be able to access all information for any incident handled by the PSAP including any notes entered by the PSAP, but a subscriber may have access only to information about their own incident, and only the information originating from the subscriber or subscriber's wireless device.

As discussed above, legacy emergency telephone systems are based upon association of a calling telephone number with a physical address. Because it was assumed that a calling party would be at a stationary address, transfer between PSAP jurisdictions was not a common occurrence. One advantage of the present invention is that the emergency safety system service provider can track an incident occurring on a mobile wireless device travelling from one PSAP's jurisdiction to another and notify each PSAP when the emergency situation transitions to a different PSAP jurisdiction. Because the emergency safety system service provider provides contact information in a standard ALI format and tracks incidents between PSAPs, there is no public capital expense and no increased operation cost involved in adapting existing PSAP capability to address transfers between PSAP jurisdictions.

A feature of the current invention is that not all features must be used for the system to enhance safety for an individual or community. For example, if a call center is not accessible at the time an alert such as a panic button actuation or call to an emergency services number is initiated, a call may be forwarded directly to a PSAP or other emergency safety organization, and/or information may still be accessible through the emergency safety system service provider's website or other network accessible resource. As another example, one or more services such as video streaming, a safety network, or other aspects of the present invention may be unavailable however available services are provided and/or available information is recorded as may be useful to enhance the safety of the end-user.

In another embodiment, different aspects of the system may be made available using different fee-based models. For example, it may be free to be a neighbor or a member of the safety network, but additional subscription is required for call-center personnel involvement in incidents. In another example, one subscription type may only result in text and e-mail involvement by call-center personnel, while a different subscription would include conference call services throughout an incident, and/or follow-up contact from call-center personnel following resolution of an incident. Group subscriptions, for example for private and/or public organizations may also be available and they may provide different services for different user types within the subscription plan as well as services that may not be available to individual subscribers such as management of or access to multiple end-user accounts and/or data.

In a preferred embodiment, offering certain services to all subscribers and some services to nonsubscribers may be advantageous for improving the efficacy and reliability of the network for all users. For example, the more individuals or organizations that subscribe to be a member of one or more safety networks and/or neighborhoods, report dangerous locations and/or situations, share the location of a wireless device with an emergency safety system service provider, and receive threat alerts, the safer all subscribers and/or members of a community are likely to be, regardless of whether the individuals or organizations subscribe to other services.

A person of skill in the art will understand that different organizations may provide elements of a safety system as described above. For example, hardware implementing the system may be provided by one entity, and call-center services may be provided by another company. In one embodiment, and alarm monitoring company may provide call-center services in conjunction with software and systems provided by emergency safety system service provider. A person of ordinary skill in the art will understand that hardware implementing the present invention may be co-located or distributed.

A person of skill in the art will understand that alternate embodiments of those described above are possible. For example, the proactive safety tools described above can be provided separately or in combination with other features. The tools themselves can be implemented with options other than the preferred embodiments described above.

As one of ordinary skill in the art will appreciate, the processes described herein for depressing and reading a panic button may be stored as computer usable instructions in a memory and executed by a processor to carry out the functions described herein. The memory and processor may be part of the same mobile device, such as a mobile telephone or a personal digital assistant, or part of the same computer. Alternatively, the program instructions or software may be stored remotely from the device having the panic button. Such instructions might also be remotely executed by a server in scenarios where the program is remotely stored from the device, as for example occurs with web enabled devices. The program instructions may also be stored on a computer usable medium, such as a CDROM or DVD, flash drive, or a computer network for example and may be used directly therefrom or may be loaded onto a device separately for use. The functionality may also reside on a single device or across multiple devices that communicate with each other over one or more network protocols. There are many such suitable network protocols, including TCP/IP, SIP, SMS and others.

A system of the present invention 100 is exemplified as shown in FIG. 1. FIG. 1 is a block diagram illustrating an exemplary system 100 in accordance with the present invention. A wireless device or devices 102 are communicatively connected through a network 104 to one or more Communication servers 106 and System Access servers 108. In some embodiments, the wireless devices 102 may also be communicatively connected to one or more Incident Coordination servers 110 and one or more Panic Sequence servers 112. One or more PSAPs 116 are communicatively connected through network 104 to one or more Communication servers 106, System Access servers 108 and Incident Coordination servers 110. One or more call centers 118 are communicatively connected through network 104 to one or more Communication servers 106, System Access servers 108, Incident Coordination servers 110, and Panic Sequence servers 112. One or more land lines 122 are communicatively connected through network 104 to one or more Communication servers 106. One or more PCs 120 are communicatively connected to Communication servers 106 and System Access servers 108. One or more Media Servers 114 are communicatively connected through network 104 to Communication servers 106, Incident Coordination servers 110, and Panic Sequence servers 112. A person of skill in the art will understand that servers 106, 108, 110, 112, and 114 may be cohosted or located remotely from one another.

Communications servers 106 may communicatively connect wireless devices 102, call centers 118, PSAPs 116, PCs 120, and land lines 122. Communications between call centers 118, PSAPs 116, PCs 120, and land lines 122 through Communication servers 106 may be sent in one or more formats including SMS, e-mail, VoIP, streaming video, or other indications format. Communication servers 106 may provide conferencing services to allow call centers 118 to communicatively connect wireless devices 102, land lines 122, and PSAPs 116 in an incident as described above.

One or more System Access servers 108 may store information related to wireless devices 102, such as subscriber information, safety network information, account information, and incident information. In some embodiments PCs 120, land lines 122, or additional wireless devices may be associated with a wireless device 102 and have permission to access the information stored for wireless 102 through System Access servers 108 by entering a password or code or, in the case of one or more PCs 120, by associating the MAC address of the PC with the account associated with the wireless device 102. In some embodiments System Access servers 108 may be co-located with or identical to Incident Coordination servers 110 or Panic Sequence servers 112. Hosts 116 and other information aggregated from Hosts 116 such as demographic and administrative information. System Access servers 108 may be communicatively connected to Media Servers 114. In one embodiment of the invention system Access servers 108 may stream video to one or more of PSAPs 116, call centers, 118 PCs 120, or land lines 122 through networks 104. In one embodiment of the invention system Media Servers 114 may stream video directly to one or more of PSAPs 116, call centers, 118 PCs 120, or land lines 122 through networks 104.

In one embodiment exemplified by FIG. 1, when a wireless device 102 such as a smart phone actuate a panic button a software application installed on the wireless device 102 connects to a System Access server 108. The System Access server 108 may have one or more databases or flat files containing subscriber information including safety network information and vital information, neighbor information, incident information, and account information. System Access server 108 may transmit information from one or all databases to wireless device 102, for example, system Access server may transmit information regarding safety network contacts to wireless device 102. Wireless device 102 may communicatively connect directly to land lines 122, PCs 120, or other wireless devices through network 104 using contact information received from System Access servers 108. Wireless devices may communicatively connect to call centers 118, PSAPs 116, and to land lines 122, PCs 120, or other wireless devices through networks 104 and communication servers 106, and may simultaneously send data or text messages through communications network 104 while can negatively connected to communication server 106.

Figure 2:
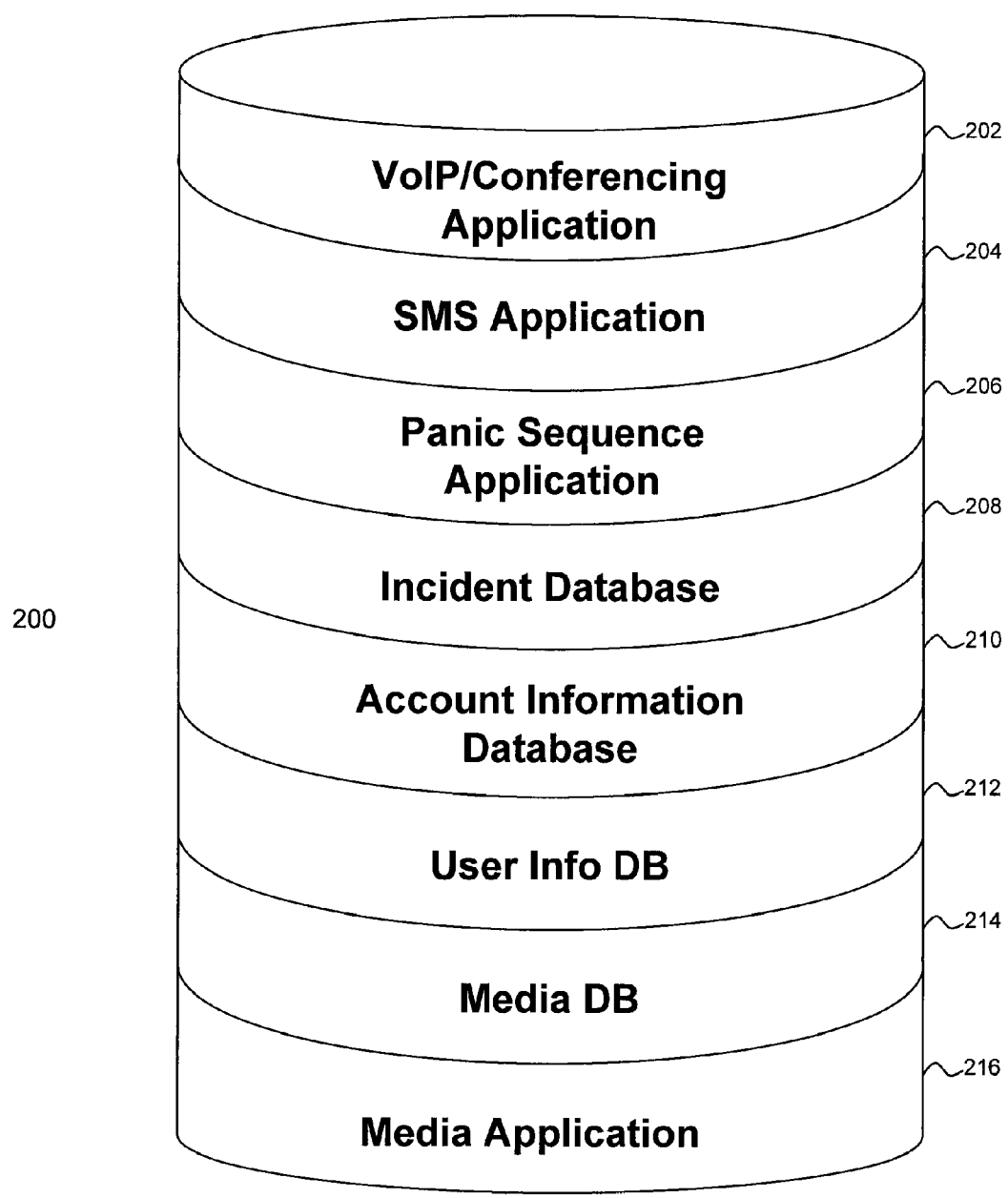
FIG. 2 depicts an exemplary database structure, according to an embodiment of the present invention.

FIG. 2 is an exemplary representation of data and applications that may be kept in one or more servers 106, 108, 110, 112, and 114 in embodiments of the present invention. In one embodiment of the present invention databases 208, 210, 212, and 214 or other data representations such as a flat file may be mirrored on one or more machines 106, 108, 110, and 112. VoIP or conferencing application 202 and SMS application 204 may interface with land lines 122, PCs 120, call centers 118, and PSAPs 116, through a web browser or other client. Servers 106, 108, 110, 112, and 114 and SMS application 204 may interface with wireless device 102 through an application installed on the device. Media application 216 may interface with media database 214 through Media Server 114 and Media Server 114 may interface with Incident Coordination server 110 and System Access server 108 to send media to recipients 116, 118, 120, and 122. Panic sequence application 206 may reside on Panic Sequence servers 112 and interface with call centers 118, PSAPs 116, and PCs 120 through a web browser or other client. Panic sequence application 206 may interface with data sources 208, 210, 212, and 214, which may be co-located on the same server or remotely located on a server communicatively connected with the application.

Incident database 208 preferably contains information recorded about current and historic incidents resulting from panic button actuations, and may also record information about other types of alerts. Account information database 210 preferably stores information related to subscription accounts such as default safety network information and other default information related to subscriptions. User information database 212 preferably stores information related to end users which may include vital information, safety network information, other contact information, options related to being a neighbor, acceptable types of communications, passwords, and other options, and may also contain historic alert information or panic button incident information. Media database 214 preferably stores audio, video, and still images transmitted from wireless device 102 as well as images related to vital information.

A panic sequence application 206 preferably resides on one or more a Panic Sequence servers 112. VoIP and or conferencing applications 202 and SMS application 204 preferably resides on one or more Communication servers 106. Media application 216 preferably resides on one or more Media Servers 114. Account information database 210 and user info database 212 is preferably maintained in conjunction with System Access servers 108. Some information in account information database 210 and user information database 212 may also reside in wireless device 102. Wireless device 102 may communicatively connect to System Access server 108 to update information in user information database 212 or account information database 210.

Figure 3:
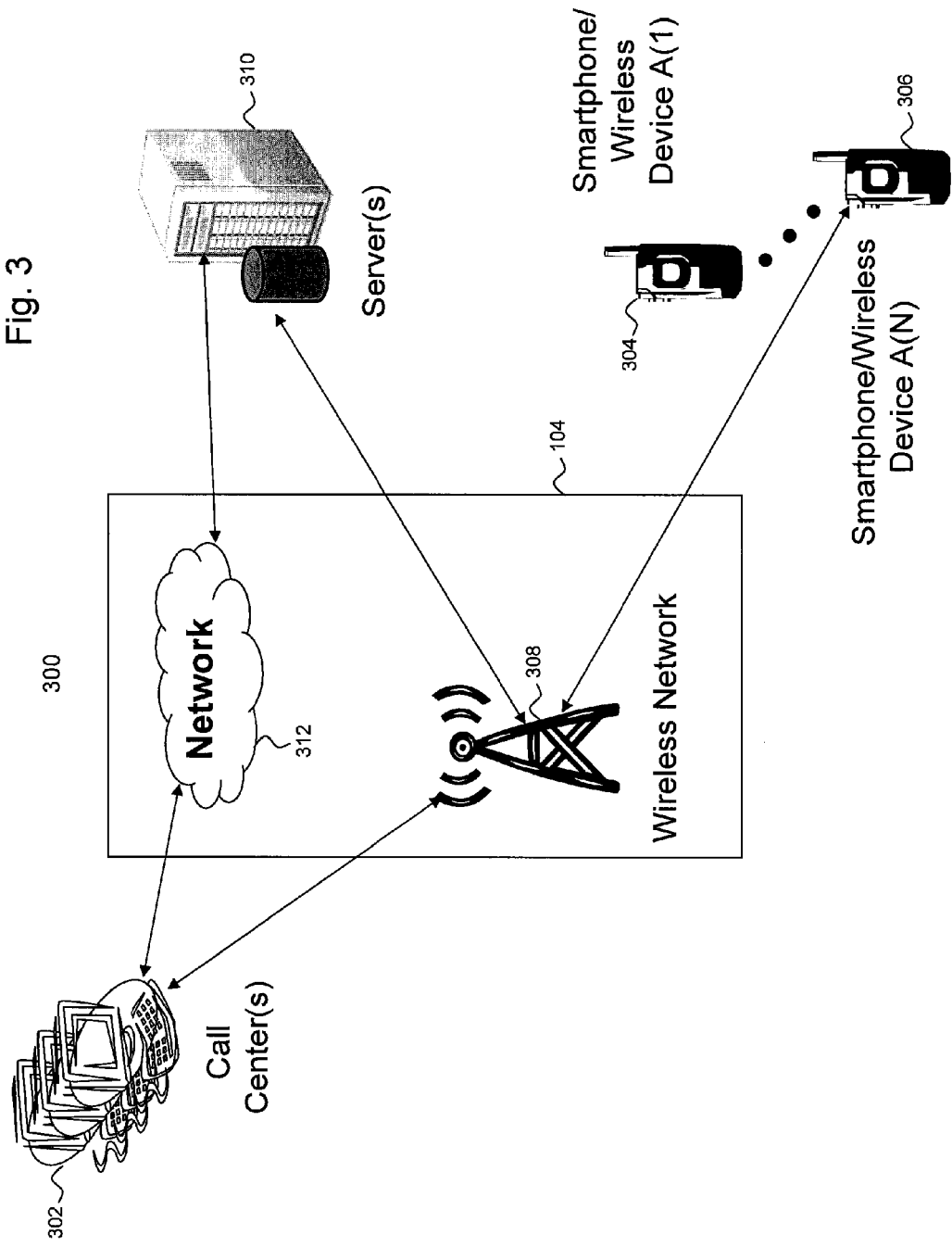
FIG. 3 depicts an exemplary system according to an embodiment of the present invention.

FIG. 3 is a block diagram illustrating an exemplary system 300 in accordance with the present invention. Wireless devices 304, 306 are communicatively connected to one or more servers 310 through a wireless network 308 and optionally through an additional connection to a wired network 312. Call-center computers 302 are connected to one or more servers 310 through wired 312 and/or wireless networks 308 or through other networks available in networks 104.

Figure 4:
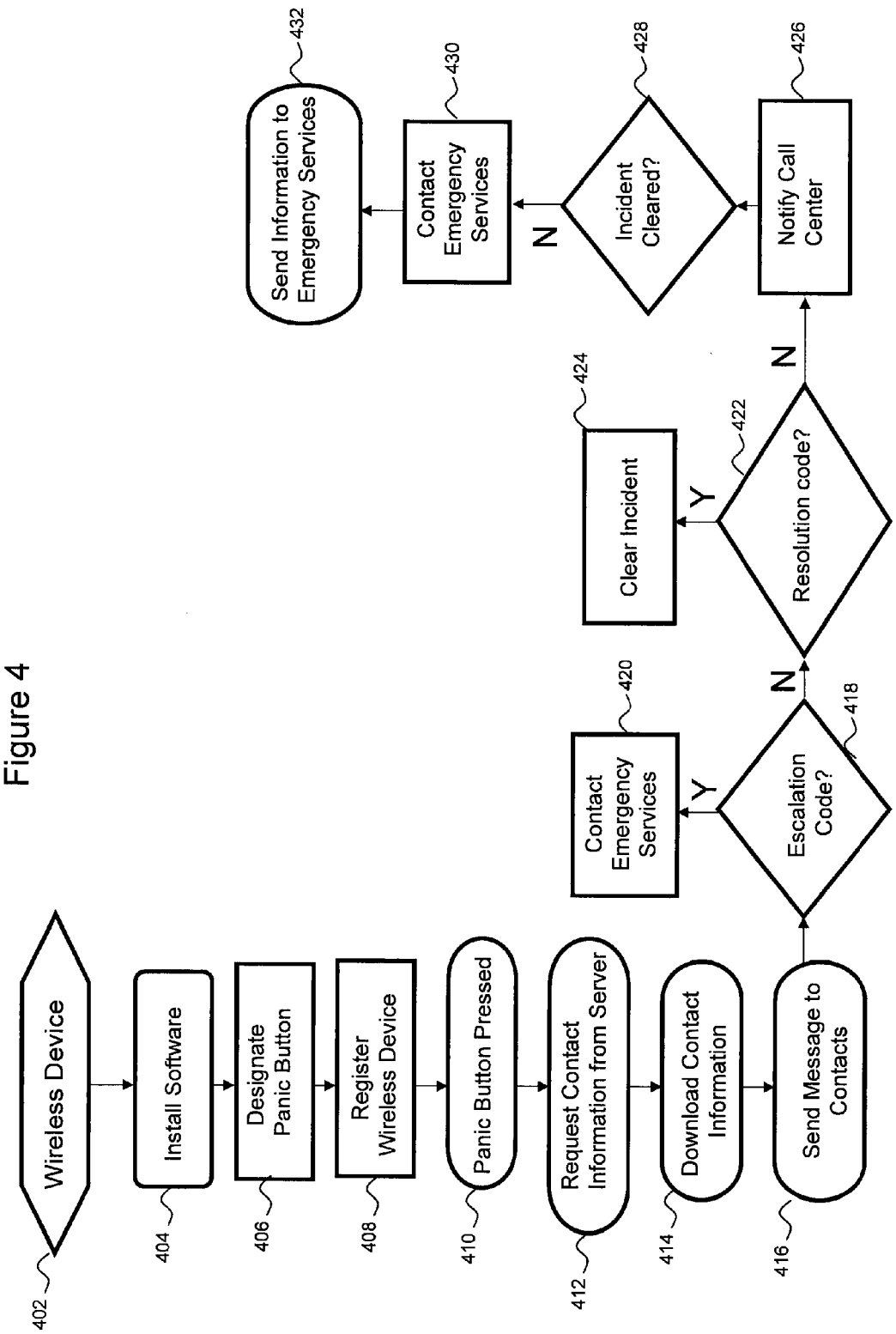
FIG. 4 depicts a flow chart detailing one implementation of computer software or smartphone applications, according to an embodiment of the present invention.

FIG. 4 is a flow chart that depicts an embodiment of the present invention, a method of providing wireless device emergency services connection, panic button functionality, and crime and safety information system and services related to such uses, including a wireless device application and safety services implemented with client-server architecture. Referring to FIG. 4, a user who may be an end-user, subscriber, retailer, manufacturer, or other individual may access a wireless device 402 and install panic button software 404. After installing the software 404, the user can designate a panic button 406 to be one or more inputs on the wireless device. The wireless device may be registered 408 with an emergency safety system service provider. When the designated panic button is pressed 410 the wireless device may access a database to read address information for parties to contact by requesting contact information from a server 412. After the wireless device has downloaded contact information 414 a can send a message to one or more contacts 416. If an escalation code is sent to the emergency safety system service provider server 418 then emergency services are contacted 420. If an escalation code is not sent 418, then if a resolution code is sent 422 the incident is cleared from the system 424. However, if after a predetermined interval a resolution code is not sent 422, a call center is notified 426, for example and emergency services center. If the call-center is unable to clear the incident 428 bit additional emergency services are contacted 430. In one embodiment, if the incident is not cleared 428 after a predetermined interval and emergency services are contacted 430 such as a police station or of other public safety provider, for example, a PSAP, a school safety official, ambulance, or other first responder. Once emergency services have been contacted 430 information is sent to emergency services 432 such as the location of the wireless device, time to panic button was pushed, name of the end-user, URL, name of the emergency safety system service provider, or an identifier for the incident, subscriber, emergency safety system service provider, or PSAP.

Each of the method steps shown in the Figures and described herein may be implemented as a software program that includes program instructions. The program instructions may be executed by a processor, microcontroller, digital signal processor or other device capable of executing program instructions as part of the method. The processor and all or portions of the software may reside on a server, a computer, a mobile device such as a smartphone, or any other device capable of executing program instructions and communicating over a network. The software may be stored and executed at a central location, such as a server, or may be stored and executed in a distributed manner at multiple servers and/or at multiple other devices. The software may be, for example, run on a server and interactions by subscriber devices may be via a web browser that interacts with the server. Alternatively, portions of the software may be made available to subscriber devices by a plug-in to a web browser. In still other embodiments, portions of the software may be embodied in application programs that run on subscriber devices and devices at the venue that in turn interact with the server and database.

Figure 5:
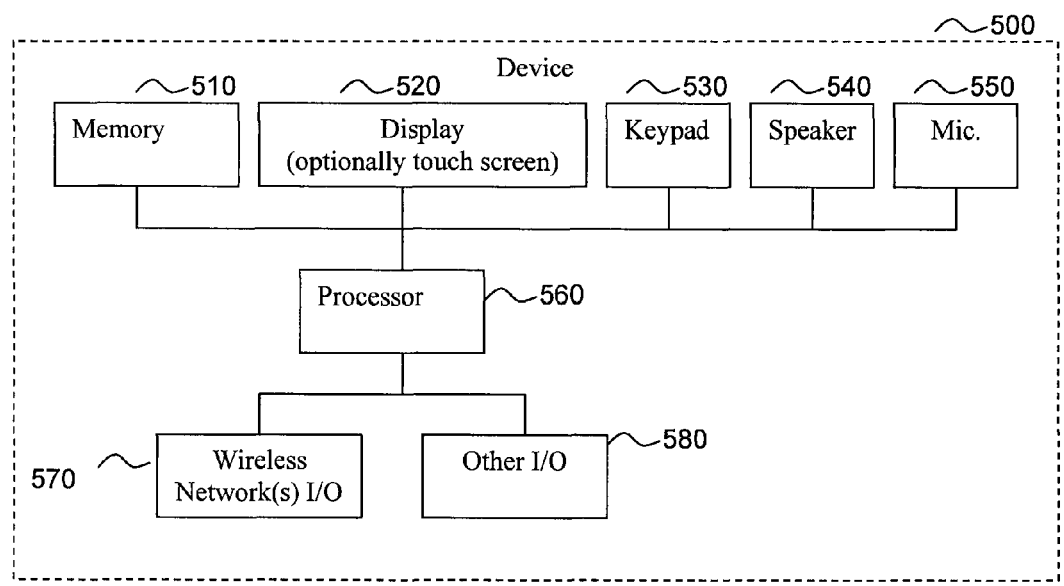
FIG. 5 is an exemplary block diagram of a device in which the present invention may be implemented.

Each of the software programs described herein may be stored in a computer usable medium, such as a memory, a hard disk drive, a solid-state memory or drive, a CD ROM or DVD or on a database or any other type of memory including memory accessible over a network. For example, the illustrative device 500 shown in FIG. 5 may be used to store the such programs in the memory 510, which may include any of the previously mentioned types of memory. During use, the software may be loaded into the memory of a general purpose computer or other device 500 that includes, for example, a processor 560 (or microcontroller, digital signal process or other device that executes instructions) coupled to a memory 510, a display 520, which may be a regular or touch screen type display, a keypad or keyboard 530, a speaker 540, a microphone 550, a wireless or other network i/o unit 570 for connecting electrically, optically or wirelessly to the Internet or other network, other i/o interfaces 580, such as a universal serial bus (USB) interface, firewire interface or other i/o interface, and any additional input/output devices such as a mouse. The software programs include program instructions and data that when loaded in the memory are accessed, executed and used by the processor to carry out described method steps described herein, including allowing data and control inputs from users or the network connection, and creating and displaying output. The input from the user may be made via any input, including the display, keypad, microphone or other input device.

While particular embodiments of the present invention have been shown and described, it will be understood by those having ordinary skill in the art that changes may be made to those embodiments without departing from the spirit and scope of the present invention.

We claim:

1. A method of registering and distributing an alarm, the method comprising:
   registering, at a server, that an alarm button has been pressed on a communications device;
   determining a location of the communications device based at least in part on a phone number or TCP/IP address assigned to the communications device;
   accessing a database to determine a safety network associated with the communications device, the safety network comprising address information of parties to contact;
   accessing the database to determine address information of subscribers proximate the location of the communications device;
   sending messages to at least one address of a party in the safety network and to at least one address of a proximate subscriber; and
   sending at least one additional message to an emergency services center.

2. The method according to claim 1, further comprising transmitting the location as part of at least one of the messages.

3. The method according to claim 1, wherein the emergency services center is chosen based on the location.

4. The method according to claim 1, wherein at least one message comprises a SIP message.

5. The method according to claim 1, wherein the communications device comprises a mobile device or a wired device.

6. The method according to claim 1, wherein the at least one additional message is sent after a predetermined interval of time.

7. The method according to claim 1, further comprising adding a party to the safety network in accordance with a request from a user of the communications device.

8. The method according to claim 1, further comprising initiating a multiparty communication between a group consisting of at least two of the safety-network parties, subscribers, and emergency services center.

9. The method according to claim 1, wherein the parties in the safety network are selected based at least in part on the location or a time of pressing the alarm button.

10. The method according to claim 1, wherein the database further comprises information concerning a user of the communications device, the information comprising a parent/guardian, name, address, picture, gender, hair color, eye color, ethnicity, height, weight, date of birth, fingerprint, DNA information, or current photo.

11. A system for registering and distributing an alarm, the system comprising:
   a. a processor operable to execute computer program instructions; and
   b. a memory operable to store computer program instructions executable by the processor, for performing the steps of:
      i. registering, at a server, that an alarm button has been pressed on a communications device;
      ii. determining a location of the communications device based at least in part on a phone number or TCP/IP address assigned to the communications device;
      iii. accessing a database to determine a safety network associated with the communications device, the safety network comprising address information of parties to contact;
      iv. accessing the database to determine address information of subscribers proximate the location of the communications device;
      v. sending messages to at least one address of a party in the safety network and to at least one address of a proximate subscriber; and
      vi. sending at least one additional message to an emergency services center.

12. The system of claim 11, wherein the communications device comprises a mobile device or a wired device.

13. The system of claim 11, wherein the at least one additional message is sent after a predetermined interval of time.

14. The system of claim 11, wherein the steps further comprise adding a party to the safety network in accordance with a request from a user of the communications device.

15. The system of claim 11, wherein the steps further comprise initiating a multiparty communication between a group consisting of at least two of the safety-network parties, subscribers, and emergency services center.

16. The system of claim 11, wherein the parties in the safety network are selected based at least in part on the location or a time of pressing the alarm button.

17. The system of claim 11, wherein the database further comprises information concerning a user of the communications device, the information comprising a parent/guardian, name, address, picture, gender, hair color, eye color, ethnicity, height, weight, date of birth, fingerprint, DNA information, or current photo.

* * * * *